United States Patent
Hackman

[15] 3,700,008
[45] Oct. 24, 1972

[54] PIPE CLAMP WITH IMPROVED GAP BRIDGE

[72] Inventor: Frank C. Hackman, Decatur, Ill.

[73] Assignee: Mueller Co., Decatur, Ill.

[22] Filed: May 28, 1971

[21] Appl. No.: 148,102

[52] U.S. Cl. .................................. 138/99, 285/373
[51] Int. Cl. ............................................. F16l 55/16
[58] Field of Search ........ 138/99; 285/236, 367, 373, 285/410, 419; 29/401; 277/9

[56] References Cited

UNITED STATES PATENTS

| | | | |
|---|---|---|---|
| 785,350 | 3/1905 | Custer | 285/373 |
| 3,173,450 | 3/1965 | Halterman | 138/99 |
| 3,487,856 | 1/1970 | Turner et al. | 138/99 |

*Primary Examiner*—M. Cary Nelson
*Assistant Examiner*—David R. Matthews
*Attorney*—Cushman, Darby & Cushman

[57] ABSTRACT

A pipe clamp for use in encircling a pipe or main, the pipe clamp being used as a pipe repair clamp or as a clamp for connecting a service line to the main. The pipe clamp comprises a split flexible band means of sheet-metal having at least one pair of confronting ends separated by a gap, the band means being provided on its inner surface with an elastomeric gasket means which seals with the exterior of the pipe or main. Lug means are provided for drawing the pair of confronting ends together to tighten the band means and gasket means about the pipe. An arcuate gap bridge member is interposed between the band means and the gasket means in an area where it spans the gap between the confronting ends. The gap bridge member is provided with a plurality of circumferentially extending and longitudinally spaced stiffening ribs or corrugations on its outer surface. These stiffening ribs function to make the gap bridge member have a uniform high gasket load completely about the edges of the gap bridge and, further, these ribs terminate short of the edges of the gap bridge and thus the low gasket load immediately beneath the ribs is completely confined. By having the ribs provide a surface for the lug means, the operative contact area between the lug means and the gap bridge member is reduced thus reducing the friction and amount of bolt torque necessary to tighten the clamp about the pipe.

5 Claims, 5 Drawing Figures

PATENTED OCT 24 1972　　　　　　　　　　　　　　　　　3,700,008
FIG. 1
FIG. 5
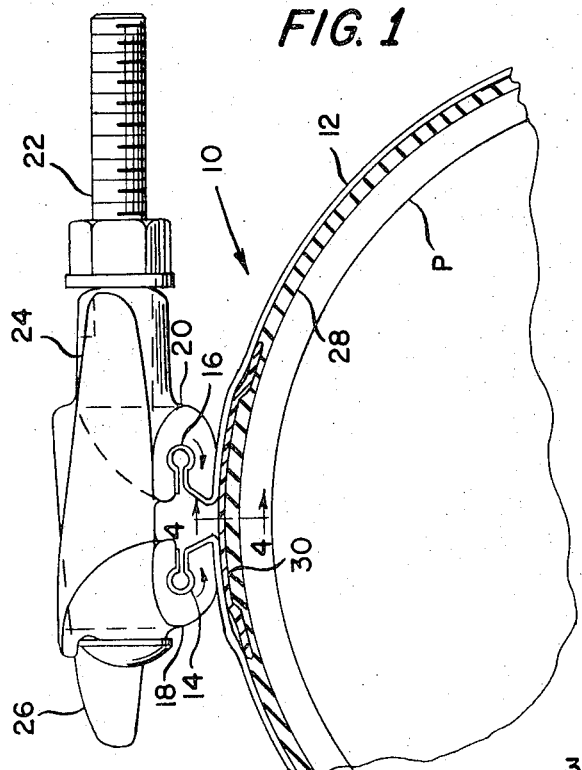
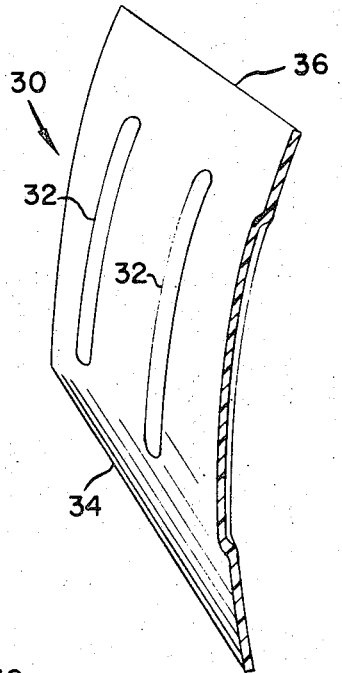
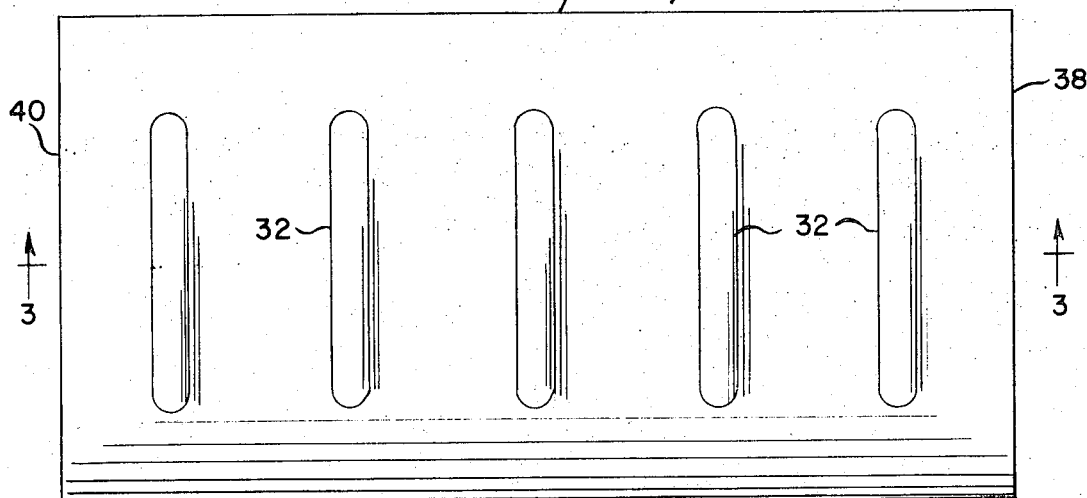
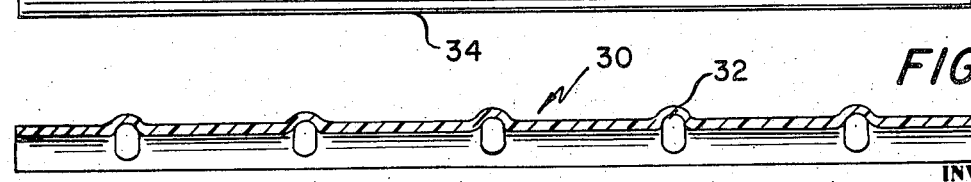
FIG. 2
FIG. 3
FIG. 4
INVENTOR
FRANK C. HACKMAN
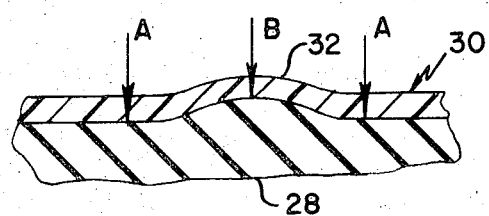
BY *Cushman, Darby & Cushman*
ATTORNEYS

PIPE CLAMP WITH IMPROVED GAP BRIDGE

The present invention relates generally to improvements of pipe clamps of the type having a split flexible band means with at least one pair of spaced end portions defining a gap, the end portions having a pair of rigid lugs attached thereto and arranged to be drawn together by bolt means. More particularly, the present invention relates to such a pipe clamp having an improved gap bridge member positioned between the split flexible band means and the elastomeric gasket means on its inner surface, the gap bridge member spanning the gap between the end portions of the band.

BACKGROUND OF THE INVENTION

Heretofore pipe clamps have been utilized which comprise split flexible band means having spaced end portions and lug means for drawing the end portions toward one another to tighten the band means about the pipe. The band means is provided on its inner surface with a gasket which also spans the gap and spanners or gap bridge members have been utilized between the gasket and the band means to prevent the gasket from extruding or blowing out of the area between the spaced ends of the band means. Another function of the gap bridge member is to act as an armor strip to span the distance between the opposed lugs of the clamp means used for drawing the ends toward each other.

To have a gap bridge member perform its primary function of preventing the gasket means from blowing out of the gap, the gap bridge member was made relatively thick so that it would have sufficient strength to transfer the lug loading through the band means to its edges across its face. However, the excessive thickness of the gap bridge member had a disadvantage of causing a loss of rubber gasket loading at its edges thus leading to a potential leakage around the gap bridge member.

Heretofore, efforts have been made to eliminate these problems and have included tapering the edges of the relatively thick gap bridge member or sinking a thick gap bridge into the rubber gasket. However, both of these arrangements while they did give a sufficiently strong gap bridge for transferring lug loads, they still had problems with loss of gasket loading at the edges of the gap bridge. Other efforts were made to improve the functioning of a gap bridge member and these included utilizing a very thin gap bridge member but increasing the thickness of the gasket means in the area of the gap bridge member. Unfortunately, the thin gap bridge member has problems concerning transferring loads imposed thereon by the lug members and thus had a tendency to deform or bend during tightening of the clamp. A further means has been proposed of using a serrated or wavy edge on the gap bridge member so that there is no leakage path for fluid when the gap bridge is compressed into the gasket means.

Typical prior art arrangements of pipe clamps having specifically formed gap bridge members or spanners are as follows:

| Number | Name | Date |
| --- | --- | --- |
| 2,776,153 | Smith | Jan. 1, 1957 |
| 3,086,555 | Smith | Apr. 23, 1963 |
| 3,151,632 | Risley et al | Oct. 6, 1964 |
| 3,470,916 | Halterman et al | Oct. 7, 1969 |
| 3,487,856 | Turner et al | Jan. 6, 1970 |

BRIEF SUMMARY OF THE INVENTION

The present invention involves a pipe clamp of the type having a split flexible band means for encircling a pipe, the band means having spaced end portions defining a gap and capable of being drawn together by a pair of lugs having at least one bolt therebetween. The band means further has an elastomeric gasket means on its inner surface and a gap bridge member positioned between the gasket means and the band means and spanning the area of the gap between the end portions of the band means. The improved gap bridge member functions to prevent the gasket means from extruding or blowing out of the gap and even though the gap bridge member is made of a relatively thin sheet material, it yet has the strength of a thicker gap bridge member so that it can transfer the loads of the lugs during tightening to the gasket means. To realize this advantage, the gap bridge member is provided with circumferentially extending and longitudinally spaced ribs or corrugations on its outer surface that are pressed or rolled in the member, the ribs terminating short of the edges of the member. By providing such ribs the necessary strength is obtained without losing a gasket load at the edges of the gap bridge. Another advantage of providing ribs on the outer surface of the arcuate gap member is so that there is less frictional contact surface between the relatively moveable end portions and the gap bridge. In this respect there is merely line contact between the band means and the gap bridge member when the lugs are tightened, thus resulting in less torque on the lug bolts and more uniform sealing of the pipe clamp.

BRIEF DESCRIPTION OF THE DRAWING

FIG. 1 is a fragmentary sectional view through the pipe clamp of the present invention, the clamping means being shown in elevation;

FIG. 2 is a plan view looking down on the gap bridge member of the present invention, the remainder of the pipe clamp being omitted for purposes of clarity;

FIG. 3 is a sectional view taken on the line 3—3 of FIG. 2;

FIG. 4 is a fragmentary enlarged sectional view taken on the line 4—4 of FIG. 1 and illustrating the loading of the gasket by the gap bridge member and the rib or corrugation thereof, the pipe and clamping means being omitted for the purpose of clarity; and FIG. 5 is a perspective view of the gap bridge member, the view partly in section and taken through one of the circumferentially extending ribs or corrugations.

DETAILED DESCRIPTION OF THE INVENTION

Referring now to the drawings wherein like character or reference numerals represent like or similar parts, and in particular to FIG. 1, there is shown a pipe clamp of the present invention, the same being generally designated at 10. The pipe clamp 10 encircles a pipe or main P and may be of the type for repairing holes or cracks in pipes or it may be of the type provided with a service side outlet to which a service line is connected such as disclosed in the U.S. Pat. No. 3,467,943 issued Sept. 16, 1969 to Phillip N. Adams and assigned to the same assignee Mueller Co., Decatur, Illinois.

Pipe clamp 10 is a low profile type of clamp and includes a split flexible band means 12 having at least one pair of bent back end portions 14 and 16 arranged to be fixedly secured to a pair of lugs 18 and 20. Lugs 18 and 20 are adapted to be moved toward one another by means of bolts 22 to thus move the end portions 14 and 16 toward each other. Fingers 24 and 26 extending respectively from the lugs 18 and 20 engage the opposing lug to stabilize and control lug movement as the lugs are drawn together. The fingers 24 and 26 as well as the lugs 18 and 20 may be of the type fully disclosed in the co-pending United States application of Wallace E. Gould and Peter N. Cassimatis, Ser. No. 118,928 filed Feb. 25, 1971 assigned to the same assignee, Mueller Co., Decatur, Illinois or some other type of tightening means, such as those shown in the prior art hereinbefore referred to, may be used.

The pipe clamp 10 further includes an elastomeric gasket member 28 carried on the interior of the flexible split band means 12, the gasket member fully encircling the pipe P and spanning the gap between the end portions 14 and 16 of the band means 12. Preferably the band means 12 is made from a suitable rust resistant non-corrosive sheet metal material such as bronze or stainless steel and is generally curved to provide a semi-cylindrical portion having a radius of curvature which permits it to be flexed about a pipe of a size falling within a particular range of sizes. For small diameter pipe size range, the split flexible band means 12 may be made from a single section of sheet material and, thus would only have a pair of opposed spaced end portions 14 and 16 which would necessitate only a pair of clamping lugs 18 and 20 for drawing the same about the pipe. On the other hand, if the pipe clamp 10 is intended to be used with a large diameter pipe size range, then the band means is made up of at least two arcuate sections of sheet material and each opposing pair of spaced end portions 14 and 16 is provided with a pair of lugs 18 and 20 for drawing the band means tightly about the pipe. The prior art mentioned at the outset of this specification discloses both the single section and the multi-section pipe clamps and to that extent is incorporated by reference herein. Consequently it is not believed necessary to discuss in the specification or disclose in the drawings single section or multisection pipe clamps in anymore detail and it will be understood by those skilled in the art, the appended claims are intended to cover either of these arrangements.

The gasket member 28, which is made of an elastomeric material such as rubber, neophrene, or the like is bonded by a suitable adhesive or bonding material to the internal surface of the split flexible band means 12. The bonding may be over the entire contacting surfaces of the gasket member 28 and the band means 12 or just a portion of these surfaces.

Interposed between the gasket member 28 and the band means 12 and bridging the gap between the spaced opposed end portions 14 and 16 is an arcuate gap bridge member or spanner generally designated at 30. As best shown in FIGS. 2-5 inclusive, the gap bridge is arcuate in shape and generally has a radius of curvature which is complementary to the radius of curvature of the outside diameter of the pipe P. Preferably the gap bridge is made of a metal such as hard stainless steel or the like but it may be made of other materials, for example, hard plastic. If the pipe clamp is of the type in which it is necessary to provide and armor strip between the lugs, then of course the gap bridge member 30 is made of metal.

As will be noted in FIGS. 2 and 5, the arcuate gap bridge member 30 is provided on its outer surface with a plurality of stiffening ribs or corrugations 32 extending circumferentially of the gap bridge member and spaced longitudinally thereof with reference to the gap bridge member's axis. The ribs 32 which are on the outer surface of the gap bridge member 30 are formed by embossing the material from which the gap bridge member is made. Usually a rectangular piece of material is embossed with the ribs 32 and then the material is rolled so that the ribs will extend circumferentially of the same. The embossing may be accomplished by pressing or rolling the ribs 32 into the material of the gap bridge member and because of their configuration, the arcuate gap bridge member 30 is quite stiff. It should be noted that the ribs 32 terminate short of each of the longitudinally extending edges 34 and 36 of the gap bridge member 30 and the two end ribs 32 are longitudinally spaced from the edges 38 and 40 of the gap bridge member.

By providing the ribs 32 on the outer surface of the gap bridge member 30 and extending these ribs in a circumferential direction, there is only line contact between the end portions 14 and 16 of the band means 12 and the gap bridge member when the lugs 18 and 20 are drawn together. The ribs 32 thus transfer the loads imposed by the lugs and distribute this load uniformly over the entire gap bridge member. By utilizing the stiffening ribs of 32, the gap bridge member 30 can be of a thinner gauge than heretofore used since it has sufficient strength to accommodate the loads of the lugs 18 and 20 without bending or distortion of the gap bridge member. Also it should be noted that the contacting surface between the gap bridge member and the end portions of the band means is a line contact surface along each of the ribs 32 rather than over the entire surface of the gap bridge member. Consequently, when the lugs 18 and 20 are drawn up by the bolts 22 there is less friction between the gap bridge member 30 and the band means 12 and thus less torque is imposed upon the bolts 22 for a predetermined amount of tightening.

Referring now to FIG. 4 which is a fragmentary sectional view through a rib 32 of the gap bridge member 30, the view is intended to illustrate the gasket loading around such a rib. As will be appreciated, the load on the gasket member 28 in the area beneath the rib 32 will be less than that beneath the remainder of the gap bridge 30. The arrows A represent the load imposed on the gasket member 28 by the gap bridge member 30 all over the same except beneath the ribs 32 and since these loads A entirely surrounding the ribs will be higher than the loads B imposed immediately beneath the ribs 32, the loads A completely confine the loads B and consequently any leak incurring in this area is completely trapped away from the edges of the gap bridge member 30.

Preferably the gap bridge member 30 is bonded to the gasket member 28 so that there can be relative movement of both end portions 14 and 16 of the band means 12 with respect to the gap bridge member 30. The gap bridge member 30 may be bonded to the surface of the gasket member 28 or it may be bonded in a slight recess provided in the surface of the gasket.

The terminology used in this specification is for the purpose of description and not limitation, the scope of the invention being defined in the claims.

What is claimed is:

1. A pipe clamp for repairing a pipe or attaching a service line thereto comprising: split flexible band means to encircle said pipe, said band means including at least one pair of confronting ends separated by a gap; gasket means disposed between said band means and the pipe and spanning the gap; lug means for drawing said pair of confronting ends together to tighten said band means about said pipe; and an arcuate gap bridge member interposed between said band means and said gasket means and spanning the gap, said arcuate gap bridge member including a plurality of circumferentially extending and longitudinally spaced stiffening ribs on its outer surface for reducing sliding contact area between said gap bridge and said band means.

2. A pipe clamp as claimed in claim 1 in which said gap bridge member is a rectangular sheet of material in plan and having a radius of curvature substantially complementary as the radius of curvature of the outside diameter of the pipe, said ribs being embossed in said sheet of material.

3. A pipe clamp as claimed in claim 2 in which each of said ribs terminates short of respective longitudinally extending edges of said gap bridge member whereby area of low gasket load beneath each of said ribs is completely confined by areas of high gasket load and wherein areas of high gasket load extend completely about all edges of said bridge member.

4. A pipe clamp as claimed in claim 3 in which said gap bridge is metal.

5. A pipe clamp as claimed in claim 4 in which said gap bridge is secured to said gasket means and in which said gasket means is at least secured to a portion of said band means.

* * * * *